(12) United States Patent
Farhan et al.

(10) Patent No.: US 11,842,049 B2
(45) Date of Patent: Dec. 12, 2023

(54) DYNAMIC CACHE MANAGEMENT IN HARD DRIVES

(71) Applicant: Amazon Technologies, Inc., Seattle, WA (US)

(72) Inventors: Munif M. Farhan, Bellevue, WA (US); Phyllis Ng, Seattle, WA (US); Darin Lee Frink, Lake Tapps, WA (US); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/465,025

(22) Filed: Sep. 2, 2021

(65) Prior Publication Data

US 2021/0397346 A1 Dec. 23, 2021

Related U.S. Application Data

(63) Continuation of application No. 16/774,746, filed on Jan. 28, 2020, now Pat. No. 11,112,974, which is a
(Continued)

(51) Int. Cl.
*G06F 3/06* (2006.01)
*G06F 12/0866* (2016.01)
(Continued)

(52) U.S. Cl.
CPC ............ *G06F 3/061* (2013.01); *G06F 3/0644* (2013.01); *G06F 3/0655* (2013.01);
(Continued)

(58) Field of Classification Search
CPC ...... G06F 3/061; G06F 3/0644; G06F 3/0655; G06F 3/0656; G06F 3/0676;
(Continued)

(56) References Cited

U.S. PATENT DOCUMENTS

| | | | |
|---|---|---|---|
| 6,272,589 B1 * | 8/2001 | Aoki | G06F 3/0676 711/112 |
| 7,490,212 B2 | 2/2009 | Kasiraj et al. | |

(Continued)

OTHER PUBLICATIONS

Campello, "SMR: The Next Generation of Storage Technology," Data Storage Institute, Agency of Science, Technology and Research, Singapore, HGST, Storage Developer Conference, Santa Clara, 20 pp. (2015).

(Continued)

*Primary Examiner* — Aracelis Ruiz

(74) *Attorney, Agent, or Firm* — Klarquist Sparkman, LLP

(57) ABSTRACT

Technologies are provided for dynamically changing a size of a cache region of a storage device. A storage device controller writes data to the cache region of the storage device using a particular storage format. The storage device controller then migrates the cached data to a storage region of the device, where the data is written using a different storage format. A dynamic cache manager monitors input and output activity for the storage device and dynamically adjusts a size of the cache region to adapt to changes in the input and/or output activity. The dynamic cache manager can also adjust a size of the storage region. The storage device controller can automatically detect that the storage device has dynamic cache support and configure the storage device by creating the cache region and the storage region on the device.

20 Claims, 11 Drawing Sheets

Related U.S. Application Data continuation of application No. 16/180,860, filed on Nov. 5, 2018, now Pat. No. 10,572,160, which is a continuation of application No. 15/085,679, filed on Mar. 30, 2016, now Pat. No. 10,120,582.

(51) Int. Cl.
  *G06F 12/0868* (2016.01)
  *G06F 11/34* (2006.01)
  *G06F 12/0871* (2016.01)
  *G06F 12/121* (2016.01)

(52) U.S. Cl.
  CPC ......... *G06F 3/0656* (2013.01); *G06F 3/0676* (2013.01); *G06F 3/0679* (2013.01); *G06F 11/34* (2013.01); *G06F 12/0866* (2013.01); *G06F 12/0868* (2013.01); *G06F 12/0871* (2013.01); *G06F 12/121* (2013.01); *G06F 2212/1016* (2013.01); *G06F 2212/224* (2013.01); *G06F 2212/313* (2013.01); *G06F 2212/502* (2013.01); *G06F 2212/601* (2013.01)

(58) Field of Classification Search
  CPC .... G06F 3/0679; G06F 11/3034; G06F 11/34; G06F 11/3433; G06F 12/0866; G06F 12/0868; G06F 12/0871; G06F 12/121; G06F 2201/885; G06F 2212/1016; G06F 2212/224; G06F 2212/313; G06F 2212/502; G06F 2212/601
  See application file for complete search history.

(56) References Cited

U.S. PATENT DOCUMENTS

| | | | |
|---|---|---|---|
| 8,681,443 | B2 | 3/2014 | Hall |
| 9,128,634 | B1 | 9/2015 | Kang et al. |
| 2007/0088920 | A1* | 4/2007 | Garcia .................. G06F 12/08 711/154 |
| 2008/0028132 | A1 | 1/2008 | Matsuura et al. |
| 2008/0189452 | A1* | 8/2008 | Merry .................. G06F 3/0679 710/56 |
| 2012/0036328 | A1* | 2/2012 | Bay ..................... G06F 12/0893 711/146 |
| 2012/0260025 | A1 | 10/2012 | Hida et al. |
| 2014/0254042 | A1 | 9/2014 | Yeo et al. |
| 2014/0359226 | A1* | 12/2014 | Pan .................... G06F 12/0873 711/135 |
| 2015/0006811 | A1 | 1/2015 | Uehara |
| 2015/0026407 | A1* | 1/2015 | McLellan .......... G06F 12/0804 711/128 |
| 2015/0160882 | A1 | 6/2015 | Coker et al. |
| 2016/0070483 | A1 | 3/2016 | Yoon et al. |
| 2016/0299698 | A1 | 10/2016 | Hall |
| 2016/0378385 | A1 | 12/2016 | Kawakami et al. |
| 2017/0083444 | A1* | 3/2017 | Dev .................... G06F 12/0871 |

OTHER PUBLICATIONS

Jin et al., "HiSMRfs: a high Performance File System for Shingled Storage Array," Data Storage Institute, Agency of Science, Technology and Research, Singapore, IEEE, 6 pp. (2014).

\* cited by examiner

DYNAMIC CACHE MANAGEMENT IN HARD DRIVES

CROSS REFERENCE TO RELATED APPLICATIONS

This application is a Continuation of U.S. patent application Ser. No. 16/774,746, "DYNAMIC CACHE MANAGEMENT IN HARD DRIVES," filed Jan. 28, 2020, which is a Continuation of U.S. patent application Ser. No. 16/180,860, "DYNAMIC CACHE MANAGEMENT IN STORAGE DEVICES," filed Nov. 5, 2018, now U.S. Pat. No. 10,572,160, which is a Continuation of U.S. patent application Ser. No. 15/085,679, "DYNAMIC CACHE MANAGEMENT IN STORAGE DEVICES," filed Mar. 30, 2016, now U.S. Pat. No. 10,120,582, which are hereby incorporated by reference in their entirety.

BACKGROUND

Hard disk drive manufacturing appears to have reached a physical limit of storage density in hard drives that store data using the perpendicular magnetic recording (PMR). In order to continue offering hard drives with increased storage capacities, hard drive manufacturers have begun to introduce hard drives that use storage formats other than PMR, such as shingled magnetic recording (SMR). SMR records data by partially overwriting previously recorded data. This allows SMR to offer higher storage capacities than PMR. However, due to the overlapping nature of data stored using SMR, write performance in SMR drives can be slower than in their PMR counterparts in some circumstances. In an attempt to mitigate the lower write performance of SMR, some SMR hard drives include fixed-size caches, where data is first written using a non-SMR storage format and then later moved to an area where it is written using SMR storage.

DETAILED DESCRIPTION

In preexisting storage devices with on-device caches, the caches have fixed sizes. Under certain conditions, a cache in such a device can fill up rapidly, after which the performance of the device becomes significantly worse. Additionally, such a fixed-size cache cannot be shrunk to make room for more data storage in situations where a cache with the fixed size is not necessary.

At least some of the embodiments of the technologies described herein solve these problems by creating a cache zone in a storage device using a first storage format, creating a storage zone using a second storage format, and dynamically changing the size of the cache zone to adapt to changing data access demands on the storage device.

For example, when a large volume of write commands are received in rapid succession, the cache zone can be expanded automatically so that the data can be stored quickly using the first storage format. Once the level of write activity subsides, the data can be moved to the storage zone where it can be stored more compactly. The size of the cache zone can be decreased when a smaller cache is sufficient to meet the current demands placed on the storage device.

Additionally, using least some of the embodiments of the technologies described herein, a storage device's capacity and performance characteristics can be changed over time. For example, a storage device can start out as a low capacity, high performance device and transition into a high capacity device with lower performance. In a particular example, a hard drive can start out with a relatively large cache zone and a relatively small storage zone. Over time, as access demands on the hard drive decrease, the size of the cache zone can be decreased and the size of the storage zone can be increased to provide increased storage at the cost of a smaller cache zone.

Figure 1:
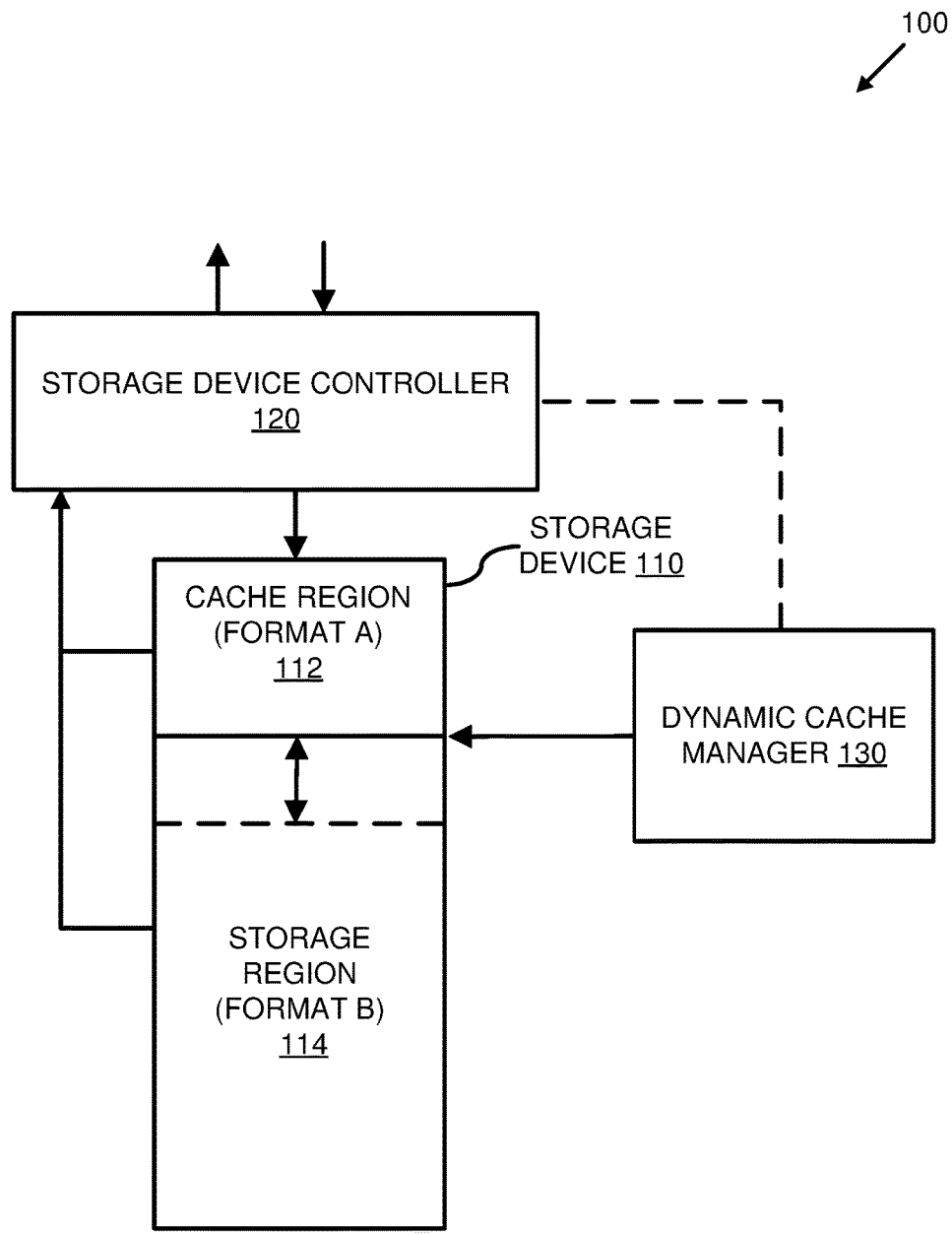
FIG. 1 is a system diagram showing an example system configured to dynamically change the size of a cache region of a storage device.

FIG. 1 is a diagram of example system 100, wherein a storage device controller 120 is configured to write data to, and read data from, a storage device 110. A dynamic cache manager 130 is configured to dynamically change a size of a cache region 112 of the storage device 130.

The storage device 110 comprises the cache region 112, wherein data is stored in a first storage format (format A), and a storage region 114, wherein data is stored in a second storage format (format B). In at least some embodiments, the first storage format used in cache region 112 gives cache region 112 a better data access performance compared to a data access performance of storage region 114. For example, the first storage format may give the cache region 112 a better write performance (e.g., a random access write performance) than a write performance of the storage region 114. In a different or further embodiment, the second storage format gives the storage region 114 a larger storage capacity compared to a storage capacity of cache region 112.

The storage device controller 120 is configured to write data to cache region 112 of storage device 110 and to read data from cache region 112 and storage region 114. In some scenarios, data can be initially written to cache region 112 to take advantage of a better write performance offered by the first storage format. Data written to the cache region 112 can then be moved to the storage region 114 at a later point in time. In some cases this is done in order to take advantage of a larger storage capacity of the storage region 114.

In some embodiments, the storage device controller can write data directly to the storage region 114 in situations where there is no performance advantage for writing the data to the cache region 112. For example, in a scenario where the first storage forma offers improved random access write performance over the second storage format, but both storage formats have sequential write access performance that is roughly equivalent, the storage device controller 120 can be configured to detect that a write access is a sequential write access and write the data directly to the storage region 114.

The storage device controller 120 can be configured to receive data read and write requests from a process, such as an application, operating system, driver, etc. In some cases, the process is running on a computer that comprises the storage device controller 120. In other cases, the process is running on a different computer that is connected to the storage device controller 120 via a communication medium. The storage device controller can write data received as part of a write request to cache region 112 of the storage device 110. At a later point in time, for instance when no read or write requests are pending, the storage device controller 120 can move the data from the cache region 112 to the storage region 114.

The dynamic cache manager 130 is configured to monitor data accesses to the storage device 110 and to dynamically adjust a size of the cache region 112 based, at least in part, on the monitored data accesses. For example, the dynamic cache manager 130 can monitor write accesses to the cache region 112 and can increase or decrease the size of the cache region 112 based on a frequency of the monitored write accesses. Dynamic cache manager 130 can also monitor an amount of data stored in cache region 112 and adjust the size of the cache region based on the amount of data stored in the cache region 112.

Dynamic cache manager 130 can be configured to dynamically adjust a size of the storage region 114. For example, in some embodiments, a total size of the storage device 110 is divided between the cache region 112 and the storage region 114. In such embodiments, the dynamic cache manager can increase the size of one region and decrease the size of the other region by a same or similar amount.

Alternatively, a buffer region (not shown) can exist between the cache region 112 and the storage region 114. In such embodiments, the dynamic cache manager 130 can be configured to adjust the sizes of the cache region 112 and the storage region 114 independently of one another.

Optionally, the dynamic cache manager 130 can be connected to the storage device controller 120. For example, the dynamic cache manager can receive write access information from storage device controller 120. The dynamic cache manager 130 can use this write access information to determine whether or not to dynamically adjust the size of the cache region 112. In some embodiments where the dynamic cache manager 130 is connected to the storage device controller 120, the dynamic cache manager 130 can use the storage device controller to dynamically change the size of the cache region 112 and/or the storage region 114.

In any of the examples described herein, a storage device can be any device capable of storing data in two separate regions or zones using different storage formats. For example, the storage device can be a magnetic storage device, such as a hard disk drive, that is capable of storing data in multiple magnetic recording formats. Other examples of storage devices include flash storage devices (such as NAND-type flash devices and NOR-type flash devices), and random access data storage devices (such as DRAM devices), that are configured to store data using more than one storage format.

In any of the examples described herein, a storage format is a format for recording data on a physical storage medium. Examples of storage formats include perpendicular magnetic recording (PMR), shingled magnetic recording (SMR), heat-assisted magnetic recording (HAMR), microwave assisted magnetic recording (MAMR), bit patterned magnetic recording (BPMR), single-level cell (SLC) storage, multi-level cell (MLC) storage, and triple-level cell (TLC) storage.

Different storage formats can have different data capacities when storing data on the same storage medium. For example, data can be stored more compactly by using an SMR format than by using a PMR format. However, the different storage formats can also have different performance characteristics. For example, in some cases random access write operations can be performed faster when data is stored using a PMR format than if the same data were stored using an SMR format.

In any of the examples described herein, a storage device controller can comprise one or more hardware components, such as a firmware, of a storage device. Alternatively, the storage device controller can be implemented at an intermediate layer between an application and the storage device. Such an intermediate layer controller can comprise software (such as a driver) and one or more processors, and/or an application-specific integrated circuit (ASIC).

In some embodiments, the storage device controller can be part of an application. In such an embodiment, the application may use the storage device controller to access a storage device directly, without using an intermediate layer, such as a driver.

The storage device controller can be located on a computer containing the storage device, or on a separate computer that is connected to the storage device via a communications channel, such as a computer network.

In any of the examples described herein, a dynamic cache manager can comprise hardware, such as a firmware, of a storage device. Alternatively, the storage device controller can be implemented at an intermediate layer between an application and the storage device. Such an intermediate layer controller can comprise software (such as a driver) and one or more processors, and/or an ASIC. In some embodiments, the dynamic cache manager is a part of, or is connected to, a storage device controller.

Although the dynamic cache manager and the storage device controller are described separately, they can both be implemented using the same software and/or hardware components.

In any of the examples described herein, a data block (or block of data) can be a sequence of data units, such as bytes, bits, etc., that has a fixed size (sometimes referred to as a "block size"). In a storage device that supports data blocks, data is read from and/or written to the storage device one block at a time. A data block can have a physical address that identifies a position where it is stored in the storage device and a logical address, such as a logical block address (LBA), that is used by external components to identify and access the data block. By using logical addresses, the physical locations of data blocks in the storage device can change without having to notify or update any external components.

Figure 2:
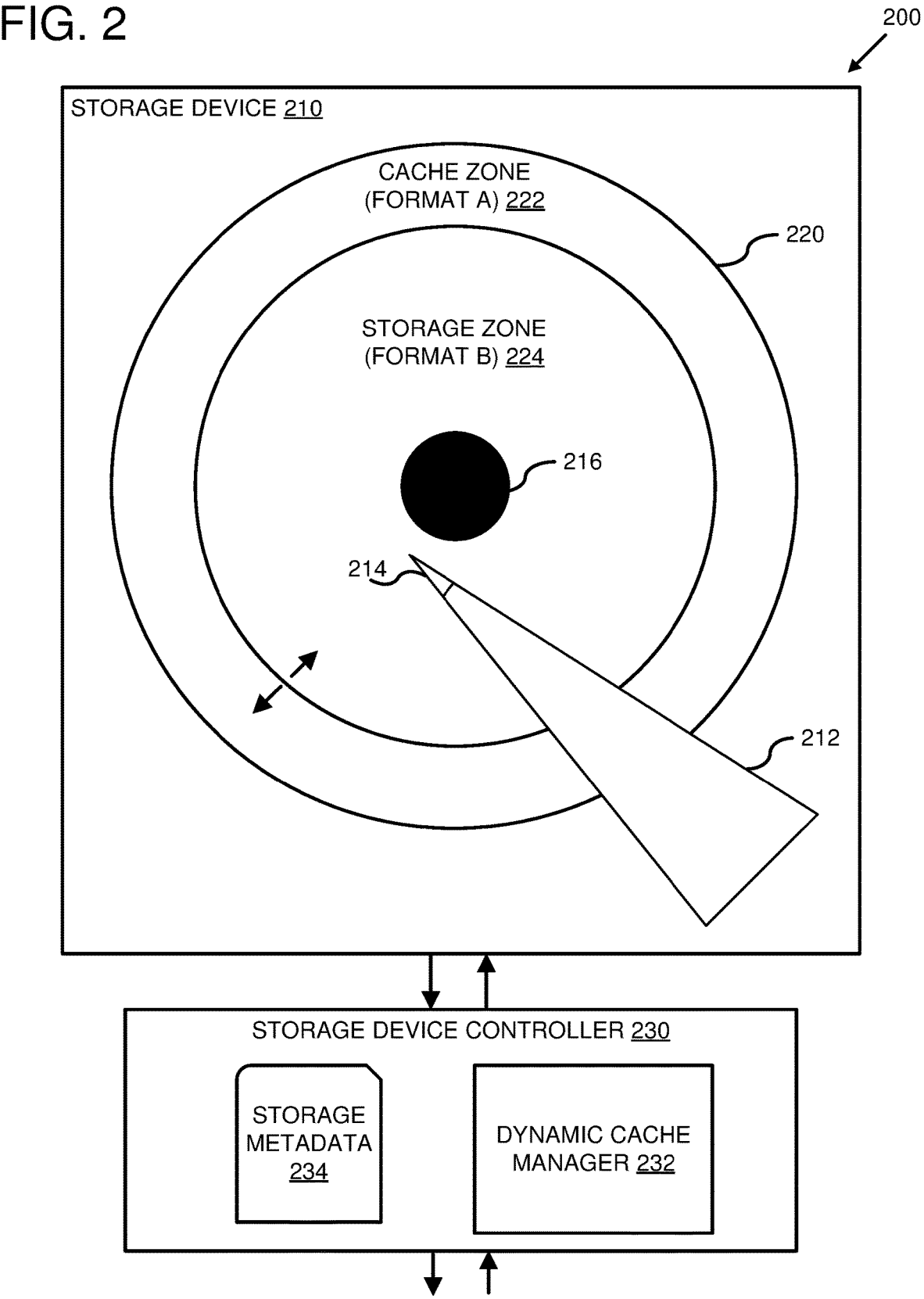
FIG. 2 is a system diagram illustrating an example system configured to dynamically change the size of a cache zone on a magnetic disk of a storage device.

FIG. 2 is a system diagram illustrating an example system 200 configured to dynamically change a size of a cache zone 222 on a magnetic disk 220 of a storage device 210.

Storage device 210 comprises a magnetic disk 220 that can be rotated on a spindle 216. The storage device 210 also comprises a moveable actuator arm 212 with a read/write head 214. The actuator arm 212 can be rotated on an actuator axis (not shown) by an actuator (not shown) to move the read/write head 214 over different portions of the magnetic disk 220. The storage device 210 is configured to write data to and to read data from the magnetic disk 220 using the read/write head 214. The read/write head 214 can comprise a single head that can perform both read and write operations. Alternatively, the read/write head 214 can comprise two separate heads for reading and writing, respectively. The storage device 210 can be configured to use the read/write head 214 to write data to the magnetic disk 220 in multiple concentric circular tracks as the magnetic disk is rotated on the spindle 216.

A storage device controller 230 can send write and read access commands to the storage device 210 to write data to and read data from the storage device 210. The storage device controller 230 can specify a location on the magnetic disk 220 at which the data is to be written or from which the data is to be read. For example, each unit of data stored on the magnetic disk 220 can have a unique address, such as an LBA, that identifies the location on the magnetic disk 220 where it is stored.

The read/write head 214 can be configured to write data to the magnetic disk 220 using two different storage formats. The storage device controller 230 can specify which storage format is to be used when reading or writing the data. The storage device controller 230 can do this, for example, by switching a storage format mode of the read/write head 214.

The storage device controller 230 can designate separate zones on the magnetic disk 220, on which data can be stored using the two separate storage formats supported by the read/write head 214. In FIG. 2, for example, a cache zone 222 is designated by the storage device controller 230 comprising one or more of the outermost circular tracks of the magnetic disk 220. Data is stored in the cache zone 222 using a first storage format (format A). A storage zone 224 is designated by the storage device controller 230 comprising the remaining inner circular tracks of the magnetic disk 220. Data is stored in the storage zone 224 using a second storage format (format B).

The determination of which storage format to use for which zone can be based on a desired storage capacity and/or a desired data access performance for each zone. For example, a storage format with relatively high data access performance but relatively low storage density may be selected for the cache zone 222. A storage format with relatively high storage density but relatively low data access performance may be selected for the storage zone 224.

In some circumstances, designating the outermost portion of the magnetic disk 220 as the cache zone 222 can be preferable since, as the magnetic disk 220 rotates, data can be read at a faster rate from the outermost tracks of the magnetic disk 220 than from the inner tracks of the magnetic disk 220. Other locations on the magnetic disk 220 for the cache zone 222 and the storage zone 224 are also possible.

The storage device controller 230 is configured to receive requests to write data to and read data from the storage device 210. The storage device controller 230 can buffer received data by writing the received data to the cache zone 222 first and then moving the buffered data from the cache zone 222 to the storage zone 224 at a later point in time.

The storage device controller can keep track of which zone is storing which particular units of data using storage metadata 234. For example, in embodiments where units of data are identified using LBA's, the storage device controller 230 can keep track of whether a given LBA is currently stored in the cache zone 222 or the storage zone 224. When the storage device controller 230 receives a read request for data stored at a particular LBA, the storage device controller can determine the current location of the particular LBA, in either the cache zone 222 or the storage zone 224, and then issue a read access command for the requested data to the storage device 210. As part of, or prior to, the read access command, the storage device controller can specify the appropriate storage format based on the zone determination. For example, if the particular LBA is located in the cache zone 222, then the storage device controller 230 can specify a storage format associated with the cache zone 222 (e.g., format A). Similarly, if the particular LBA is located in the storage zone 224, then the storage device controller can specify a storage format associated with the storage zone 224 (e.g., format B).

In some embodiments, the storage device controller 230 must specify a storage format when writing data to the magnetic disk 220, but not when reading data from the magnetic disk 220. For example, read/write head 214 may use different modes for writing data in the different storage formats, but it may be able to read data stored in either format using a single read mode.

In scenarios where the storage device controller 230 buffers received data to the cache zone 222, the storage device controller can use the storage metadata 234 to determine whether an LBA for the received data is already stored in the cache zone 222. If the LBA for the received data is already present in the cache zone 222, then the received data can be written to the location in the cache zone 222 where the LBA is already stored. Otherwise, the received data can be written to an available location in the cache zone 222 and the storage metadata 234 can be updated to indicate that the received data is now stored in the cache zone 222.

The storage device controller 230 comprises a dynamic cache manager 232 that is configured to dynamically adjust the relative sizes of the cache zone 222 and the storage zone 224. For example, the dynamic cache manager 232 can monitor access to the magnetic disk 220 and adjust the sizes of the two zones based on a rate at which data is being written to the cache zone 222.

The dynamic cache manager 232 can dynamically change the sizes of the zones based on an amount of data written to the cache zone 222. For example, the dynamic cache manager 232 can compare the amount of data written to the cache zone 222 to a specified threshold. In some scenarios, if the amount of data is greater than or equal to the specified threshold, the dynamic cache manager 232 increases the size of the cache zone 222. An increase of the size of the cache zone 222 by a certain amount may require a decrease of the size of the storage zone 224 by the same amount.

The dynamic cache manager 232 can dynamically change the sizes of the zones based on a frequency of data access of one or both of the zones. A determination to change a size of one or both of the zones can be based, at least in part, on which of the zones is the most frequently accessed and/or which of the zones is the most recently accessed. A determination to change a size of one or both of the zones can be based, at least in part, on a determination that one of the zones is more critical at a given time. Such a determination that a zone is more critical can be based, for example, on a pattern of data access requests that are received at the storage device.

In some scenarios, if the amount of data is less than the specified threshold, the dynamic cache manager decreases the size of the cache zone 222. A decrease of the size of the cache zone 222 by a certain amount may require an increase in the size of the storage zone 224 by the same amount. In some embodiments, a first specified threshold is used for determining when to increase the size of the cache zone 222 and a second, separate specified threshold is used for determining when to decrease the size of the cache zone 224.

A specified threshold can be a certain amount of data specified in data units, such as bits, bytes, data blocks, etc. The specified threshold can be a certain percentage of the current size of the cache zone 222. For example, the specified threshold can indicate that the size of the cache zone 222 should be increased if more than a certain percentage of the cache zone 222 contains data. The specified threshold can indicate that the size of the cache zone should be decreased if less than a certain percentage of the cache zone 222 contains data.

The specified threshold can be defined as a rate of data writes, such as a certain amount of data written to the cache zone 222 over a certain period of time. If the specified amount of data, or more than the specified amount of data, is written to the cache zone 222 within the specified time period, then the dynamic cache manager 232 can increase the size of the cache zone 222. Or, if less than the specified amount of data is written to the cache zone 222 within the specified time period, then the dynamic cache manager 232 can decrease the size of the cache zone 222.

The specified threshold can also comprise multiple criteria for adjusting the size of the cache zone 222. For example, the specified threshold could stipulate that the size of the cache zone 222 should be adjusted if more than a certain percentage of the cache zone 222 contains data and data is being written to the cache zone 222 faster than a specified rate.

Separate thresholds can be specified for increasing and decreasing the size of the cache zone 222. For example, two thresholds can be specified to create an acceptable range for the cache zone 222. While measured data access activity is within the acceptable range, the size of the cache zone 222 will not be adjusted. If the measured data access activity falls below the range, then the size of the cache zone 222 will be decreased. If the measured data access activity exceeds the upper limit of the range, then the size of the cache zone 222 will be increased.

In some embodiments, the dynamic cache manager 232 can change the size of the cache zone 222 when the specified threshold is reached. In other embodiments, an event can be raised when the measured disk activity reaches the specified threshold. A counter can be used to track a number of the events that have occurred. In such embodiments, the dynamic cache manager 232 can adjust the size of the cache zone 222 if a certain number of the events occurs within a given time period.

An increment size can be specified, indicating an amount by which the size of the cache zone 222 should be increased or decreased. The increment size can be specified as a fixed amount of data, as a percentage of the current size of the cache zone 222, as a percentage of the current size of the storage zone 224, etc. If separate thresholds are specified for increasing and decreasing the size of the cache zone 222, separate increment sizes can be associated with each of the specified thresholds.

In some cases, the cache zone 222 can fill up with data before a specified threshold triggers the dynamic cache manager 232 to increase the size of the cache zone 222. In such cases, when data writes are received and the cache zone 222 is already full, data stored in the cache zone 222 is evicted from the cache zone 222 to make room for the received data. Eviction of data from the cache zone 222 can comprise moving the evicted data from the cache zone 222 to the storage zone 224. Determining which data to evict from the cache zone 222 can be based on a cache eviction strategy, such as first-in-last-out (FILO), first-in-first-out (FIFO), time-based eviction, least accessed eviction, time between accesses eviction, or any combination thereof. Other cache eviction techniques are also possible.

Occasionally, all data currently stored in the cache zone 222 can be flushed to the storage zone 224. This may occur periodically, such when a recurring period of time elapses. The flushing may occur as a result of some triggering condition. For instance, data may be flushed from the cache zone 222 when no read or write requests for data stored in the cache zone 222 are pending. In some cases, the cache zone is flushed when the cache zone has reached its full capacity, i.e., the cache zone cannot store any more data.

The sizes of the zones, the specified threshold or thresholds, the amount of data written to the cache zone 222, and/or the specified increment size can be stored in the storage metadata 234.

Although the dynamic cache manager 232 is illustrated as being part of the storage device controller 230, in some embodiments the dynamic cache manager 232 and the storage device controller are implemented as separate components.

Figure 3:
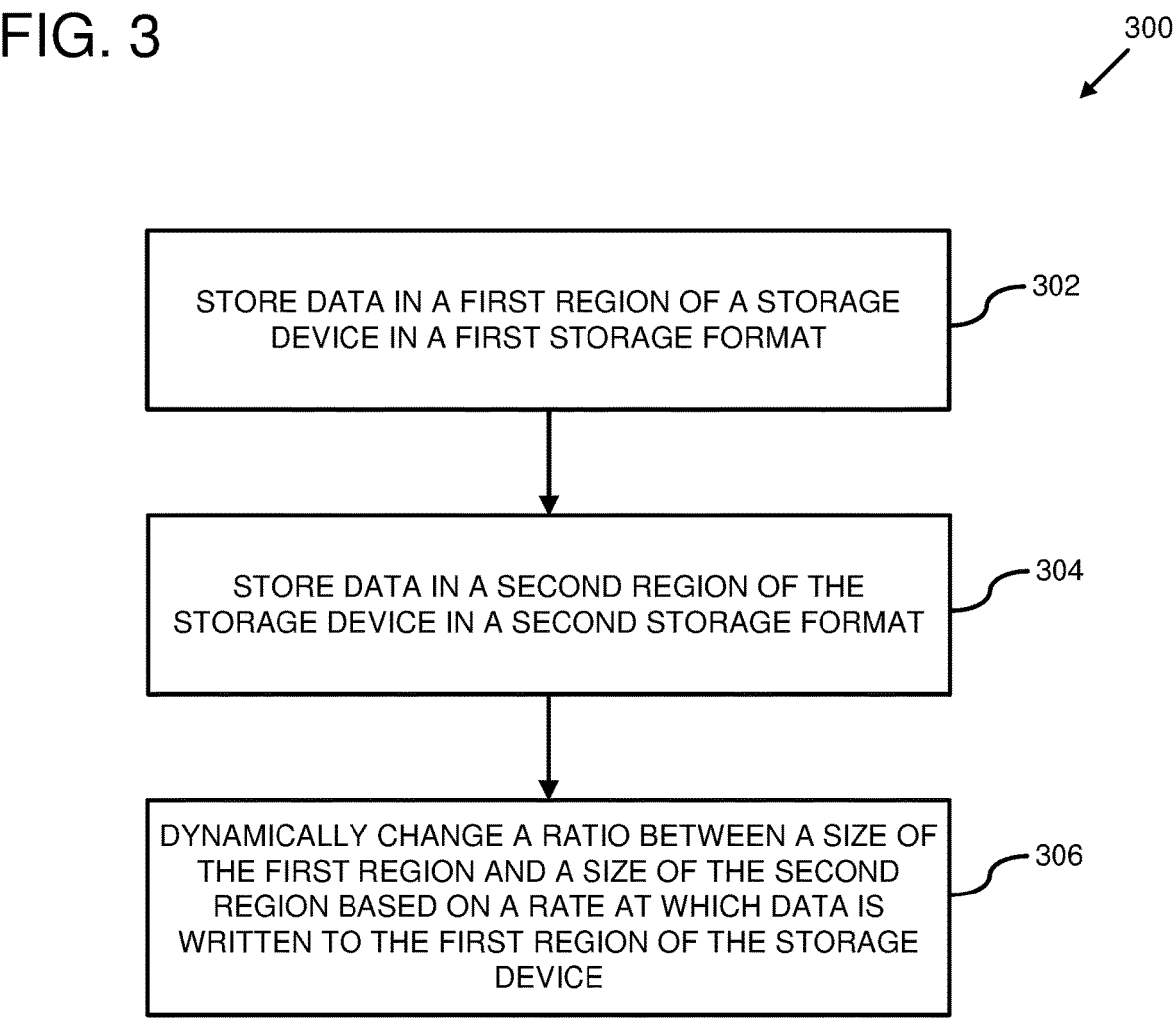
FIG. 3 is a flowchart of an example method of dynamically changing a ratio between a size of a first region of a storage device, with data stored in one storage format, and a size of a second region of the storage device with data stored in another storage format.

FIG. 3 is a flowchart of an example method 300 of dynamically changing a ratio between a size of a first region of a storage device and a size of a second region of the storage device. Example method 300 can be performed using any of the example systems described herein.

At 302, data is stored in a first region of the storage device in a first storage format. Storing data in the first region can comprise receiving data and buffering the received data in the first region using the first storage format. At 304, data is stored in a second region of the storage device in a second storage format. Storing data in the second region can comprise moving buffered data from the first region to the second region. For example, the buffered data can be removed from the first region and re-written in the second region using the second storage format. Alternatively, the buffered data can be copied to the second region and left in the first region. The location of the buffered data in the first region can then be freed so that incoming data can be written to the location in the first region.

At 306, a ratio between a size of the first region and a size of the second region is dynamically changed based on a rate at which data is written to the first region of the storage device. Dynamically changing the ratio can comprise increasing the size of the first region by an increment size and decreasing the size of the second region by the increment size. Dynamically changing the ratio can, alternatively, comprise decreasing the size of the first region. In some embodiments, the dynamically changing the ratio comprises expanding the first region to contain all or part of an extended buffer region on the storage device.

In embodiments where the storage device's entire capacity is divided between the first region and the second region, the ratio can be expressed in terms of percentages of the storage device's total capacity. For example, a ratio of "15/85" can indicate that the first region occupies 15% of the storage device's total capacity and the second region occupies the remaining 85% of the storage device's total capacity. In such an embodiment, dynamically changing the ratio can comprise increasing the percentage of the storage device's capacity occupied by one zone by a certain amount and decreasing the percentage of the storage device's capacity occupied by the other zone by the same amount. For example, the ratio of "15/85" can be dynamically changed to "20/80" by increasing the size of the first region by 5% of the storage device's total capacity and decreasing the size of the second region by 5% of the storage device's total capacity.

The dynamically changing the ratio can comprise detecting that the rate at which data is written to the first region is equal to a specified threshold. In some cases, the detecting comprises determining that the rate is greater than or equal to the specified threshold. In some cases, the detecting comprises determining that the rate is less than or equal to the specified threshold. The detecting can comprise monitoring data writes to the first region of the storage device, determining the rate at which the data is written to the first region based on the monitored data writes, and comparing the determined rate to the specified threshold. The rate can be a ratio between a number of monitored data writes and a period of time in which the monitoring took place.

Figure 4:
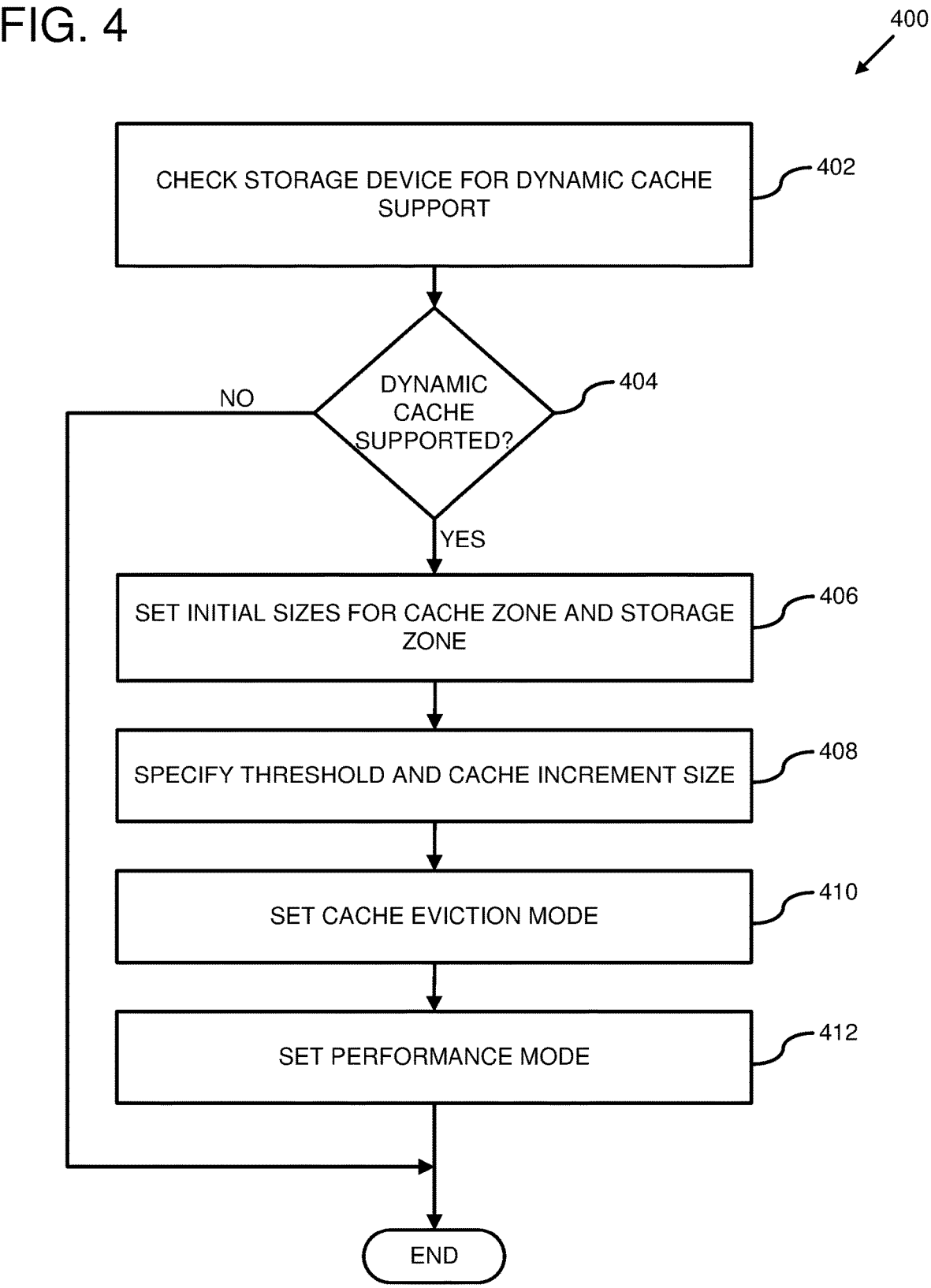
FIG. 4 is a flowchart of an example method of determining whether a storage device has dynamic cache support and configuring the device if it does have dynamic cache support.

FIG. 4 is a flowchart of an example method 400 of automatically determining whether a storage device has dynamic cache support and, if the storage device does have dynamic cache support, configuring the device to take advantage of the dynamic cache support. Example method 400 can be performed using any of the example systems described herein.

At 402, the storage device is checked for dynamic cache support. The checking can comprise inspecting one or more values in a firmware of the storage device. For example, a page in the firmware of the storage device can contain an identifier, such as a device ID, that can be used to determine what features are supported by the storage device. The value or values inspected in the firmware can be provided by the storage device manufacturer. Alternatively, a custom page containing the value or values can be added to the firmware after receiving the storage device.

In some cases, a specific code or identifier is used to indicate that the storage device has dynamic cache support. In other cases, multiple values are used to indicate support for various features. In such cases, the checking at step 402 comprises determining whether the features supported by the storage device include features necessary for performing dynamic cache functionality.

At 404, if it was determined at 402 that the storage device has dynamic cache support, then the storage device is configured at 406-412. However, if it was determined that the storage device does not have dynamic cache support, then the example method 400 terminates.

At 406, initial sizes are set for a cache zone and a storage zone on the storage device. In some cases, both an initial size for the cache zone and an initial size for the storage zone can be set. In other cases, only an initial size for one of the zones is provided and the initial size of the other zone is set to a difference between the provided initial size and a total capacity of the storage device.

Data is stored in the cache zone and the storage zone using different storage formats. In some cases, the particular storage formats to use for the cache zone and storage zone, respectively, can be specified or selected from a list of storage formats supported by the storage device.

Locations in the storage device of the cache zone and/or the storage zone can also be specified. In an embodiment where the storage device comprises a magnetic disk, an initial location of the cache zone can be specified in terms of storage tracks of the magnetic disk. For example, the initial location of the cache zone can be specified as the outermost track of the magnetic disk. Such an initial location, in combination with the specified initial cache zone size, could result in a cache zone on the magnetic disk comprising a number of the outermost circular tracks of the disk.

At 408, a dynamic cache threshold and increment size are specified. The threshold is set to trigger a change in the size of the cache zone of the storage device. For example, a counter can be used to track an amount of data written to the cache zone. When a value of the counter is equal to the threshold, the size of the cache zone can be changed.

The threshold can be used to detect that the cache zone is close to filling up with data and to trigger an increase in the size of the cache zone. In a different or further embodiment, the threshold can be used to detect that write activity to the storage device has fallen below a certain level and to trigger a decrease in the size of the cache zone.

The threshold can be specified as an amount of data. Once that amount of data has been written to the cache zone, an increase in the size of the cache zone is triggered. In another example, the threshold is specified as a percentage. Once the specified percentage of the cache zone contains data, the cache zone increase is triggered.

The threshold can also be specified as frequency of write operations. For example, an increase in the cache zone size can be triggered when a frequency of write operations is equal to or greater than the specified frequency. In a different or further embodiment, when a frequency of write operations is less than the specified frequency, the size of the cache zone can be decreased.

In some embodiments, the frequency of write operations can be a frequency of random access write operations. In some cases, sequential access write operations can be performed in both the cache zone and the storage zone with relatively comparable performance. In these cases, writing sequential data units to the cache zone may not yield a performance benefit. In fact, overall write performance of the storage device may be decreased in these cases, since the cache zone may fill up with sequential data units and leave no room for data units written by random access write operations. To avoid this, sequential access write operations can be detected and performed directly in the storage zone, thereby leaving the cache zone available for random access write operations.

The threshold can comprise multiple conditions for triggering changes to the size of the cache zone. For example, a first condition may be specified for triggering an increase in the size of the cache zone and a second condition may be specified for triggering a decrease in the size of the cache zone.

The increment size specifies an amount by which the size of the cache zone is adjusted when the threshold is triggered. If no increment size is provided, a default increment size can be used. The increment size can be specified as a fixed amount, such as a number of data units, or as a percentage. The increment size can remain constant once it is specified. Alternatively, the specified increment size can be an initial increment size that can be subsequently adjusted in response to changing disk activity patterns.

In embodiments where the specified threshold comprises multiple criteria for triggering cache zone size changes, the multiple criteria can be associated with different increment sizes.

At 410, a cache eviction mode is set. The cache eviction mode, sometimes referred to as a "data management mode," can control a manner in which data is moved from the cache zone to the storage zone. An example eviction mode is FILO, in which the first data written to the cache zone is the last data to be moved out of the cache zone.

Another example eviction mode is "least accessed," in which data accesses, such as write accesses and/or read accesses, are tracked for blocks of data stored in the cache zone and blocks with fewer data accesses are moved out of the cache zone before moving out blocks with more data accesses. For example, a first data block evicted from the cache zone under a "least accessed" mode could be a data block with a fewest number of write accesses compared to other blocks of data in the cache zone.

Another example cache eviction mode is FIFO, wherein the first data written to the cache zone is the first data to be evicted from the cache zone. Another example cache eviction mode, time-based eviction, evicts data from the cache zone based on an amount of time (e.g., a number of milliseconds, seconds, etc.) the data has been in the cache zone. Another example cache eviction mode, time between accesses, tracks an average amount of time between data accesses for each data block stored in the cache zone and evicts data blocks with larger average times between accesses before evicting data blocks with smaller average times between accesses.

The cache eviction mode can have an impact on the performance of the storage device in some circumstances. For example, in an embodiment where the cache zone uses a storage format that has better random access write performance than the storage format used for the storage zone (such as when the cache zone uses a PMR storage format and the storage zone uses an SMR storage format), a cache eviction mode that keeps frequently written data blocks in the cache zone can improve the random write access performance of the storage device. In an embodiment where the cache zone comprises one or more outermost circular tracks of a hard disk of the storage device, a cache eviction mode that keeps frequently accessed data in the cache zone can improve data access performance of the storage device if the outermost tracks of the hard drive have a better transfer rate.

At 412, a performance mode is set. The performance mode can control performance and capacity characteristics of the storage device. For example, the performance mode can dictate a maximum and/or minimum size for the cache zone. The performance mode may control whether or not the cache zone is allowed to completely fill up with data. For example, based on the performance mode, if the cache zone is close to filling up with data, a cache zone size increase may be triggered even if the specified threshold has not been reached. Alternatively, based on the performance mode, data may be preemptively evicted from the cache zone if it is close to filling up. The performance mode can also control if, and/or how, the specified threshold and increment size are dynamically adjusted based on changing patterns of data access activity. The performance mode can control other characteristics of the storage device as well, such as a spin-down frequency of a hard disk.

In some embodiments, one or more of 402-412 are performed by a storage device controller connected to the storage device. One or more of 402-412 can be performed by an application running on a computer connected to the storage device. One or more of 402-412 can be performed by intermediate software, such as a driver, or intermediate hardware, such as a firmware or an SOC.

An example performance mode can emphasize write and read performance of the storage device by maximizing a size and location of the cache zone on the storage device and by limiting or preventing spin-down of a hard disk of the storage device. Another example performance mode can emphasize storage capacity of the storage device by limiting the size of the cache zone and allowing the cache zone to fill up with data.

In environments containing several networked storage devices, example method 400 can be used to automatically detect which of the storage devices have dynamic cache support and to automatically configure those storage devices that have dynamic cache support.

Figure 5:
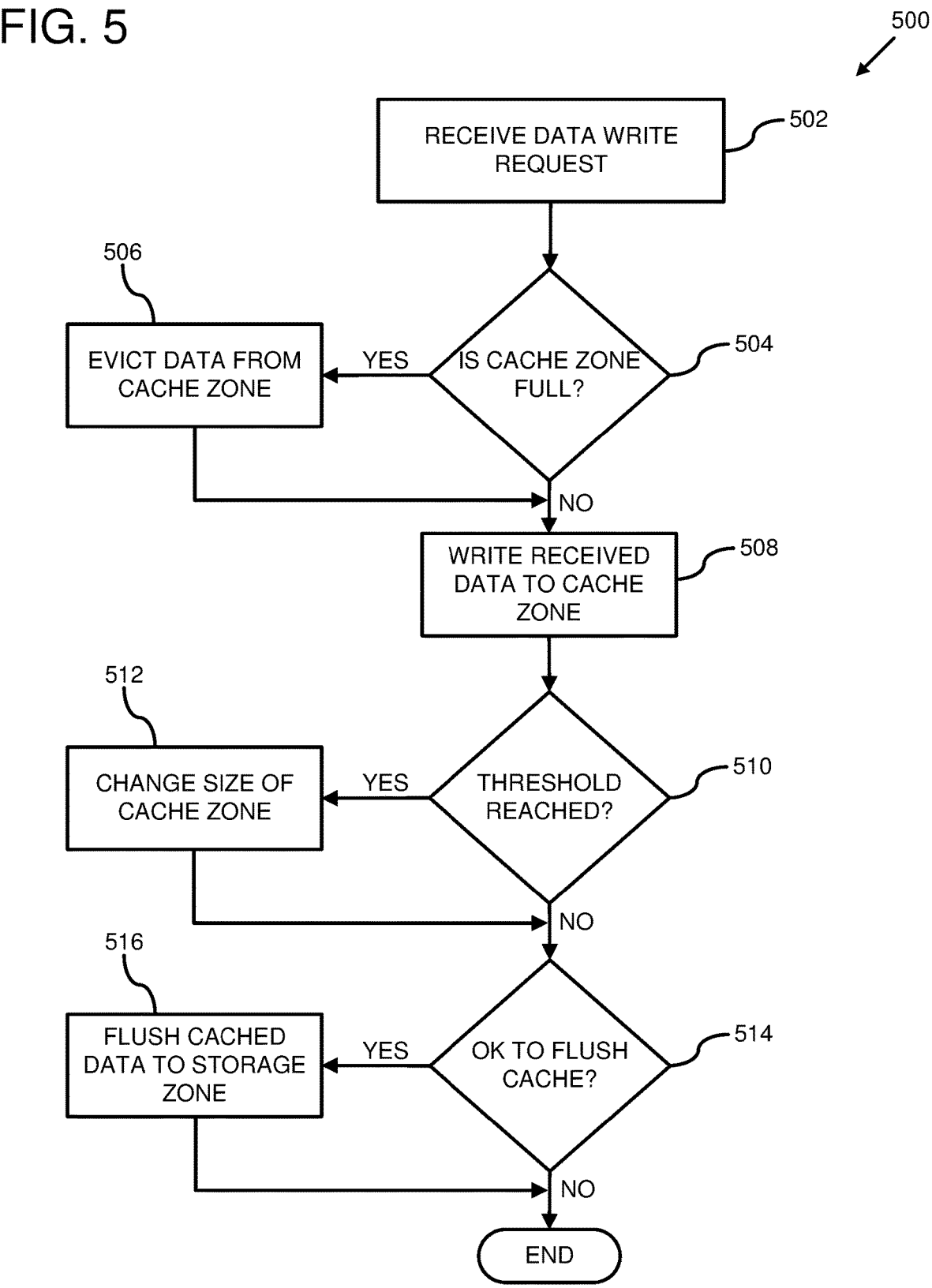
FIG. 5 is a flowchart of an example method of dynamic cache management.

FIG. 5 is a flowchart of an example method 500 of dynamic cache management, comprising writing data to a cache zone of a storage device, changing a size of the cache zone if a threshold is reached, and flushing the cached data to a storage zone of the storage device. Example method 500 can be performed using any of the example systems described herein.

The storage device comprises a cache zone with data stored using a first storage format and a storage zone with data stored using a second storage format. In some cases, data can be written faster using the first storage format but data can be stored more densely using the second storage format. For example the PMR and SMR storage formats can be used for the cache zone and the storage zone, respectively. In some cases, data can be stored more densely using the SMR format, but random access writes can be performed faster using the PMR format.

At 502, a request to write data to the storage device is received. The request can comprise an amount of data to write to the storage device and one or more logical storage addresses for the amount of data. For example, the request can comprise one or more blocks of data with corresponding LBA's.

At 504, it is determined whether the cache zone of the storage device is full. The determining can comprise determining whether or not there is room in the cache zone to store the received data. The determining can comprise determining whether or not an amount of data stored in the cache zone is equal to a capacity of the cache zone. If the cache zone is full, then at 506 data is evicted from the cache. The evicting can comprise migrating the evicted data from the cache zone to the storage zone in order to make room for the received data in the cache zone. Data can be evicted from the cache according to a cache eviction strategy such as FILO, FIFO, least accessed eviction, etc.

If the cache zone is not full, or after evicting data from the cache zone at 506, at 508 the received data is written to the cache zone of the storage device. The data is written to the cache zone using the first storage format.

At 510, it is determined whether a predefined threshold has been reached. The determining can comprise comparing a value of a data access activity metric to the predefined threshold and concluding that the predefined threshold has been reached if the value is greater than or equal to the predefined threshold. Alternatively, the determining can comprise concluding that the predefined threshold has been reached if the value of the data access activity metric is less than the predefined threshold.

The data access activity metric can indicate a degree of data placement in the cache zone. Examples of data access activity metrics that indicate a degree of data placement include a number of write accesses and/or read accesses for locations within the cache zone, a rate of data accesses per time period (e.g., a number of reads and/or writes per second), an amount of data currently stored in the cache zone, a percentage of the cache zone that currently contains data, etc. The predefined threshold can be expressed in terms of a numerical value (e.g., an amount of data), a percentage (e.g., a percentage of the cache zone's capacity), a rate (e.g., a number of write accesses per time period), etc. The predefined threshold can also indicate whether the threshold is a ceiling or floor. If the threshold is a ceiling, then the predefined threshold is reached if the value of the data access activity metric is equal to or greater than the threshold. If the threshold is a floor, then the predefined threshold is reached if the value of the data access activity metric is equal to or less than the threshold.

If the threshold has been reached, then at 512 a size of the cache zone is changed. The size of the cache zone can be changed by increasing or decreasing an amount of the storage device's capacity that is occupied by the cache zone. In some cases, a size of the storage zone can be decreased in order to increase the size of the cache zone. Similarly, in some cases the size of the storage zone can be increased when the size of the cache zone is decreased.

At 514, it is determined whether the data stored in the cache zone can be flushed to the storage zone of the storage device. In some embodiments, the cache zone is flushed when no data access requests are pending for data blocks stored in the cache zone. In different or further embodiments, the cache zone is flushed when a specified number of cache eviction operations have occurred within a specified period of time.

The decision to flush the cache zone can be based, at least in part, on a performance mode that has been set for the storage device. For example, an aggressive performance mode may emphasize growing the cache more frequently and flushing the cache less frequently. Whereas, a more conservative performance mode may increase the size of the cache zone less frequently and flush the cache more frequently.

If the cache zone should be flushed, then at 516 data stored in the cache zone is migrated to the storage zone. The migrating can comprise copying the data from the cache zone and writing the data to the storage zone using the second storage format. Once the data has been copied, the locations of the migrated data in the cache zone can be marked in a data structure to indicate that they are available for data to be written to them. In some embodiments, all of the data currently stored in the cache zone is migrated to the storage zone as part of the migration process. In other embodiments, less than all of the data in the cache zone is migrated. The data can be migrated according to a cache eviction strategy. Alternatively, the data can be migrated according to an order the data blocks are stored in the cache zone, or based on addresses of the data blocks.

Figure 6:
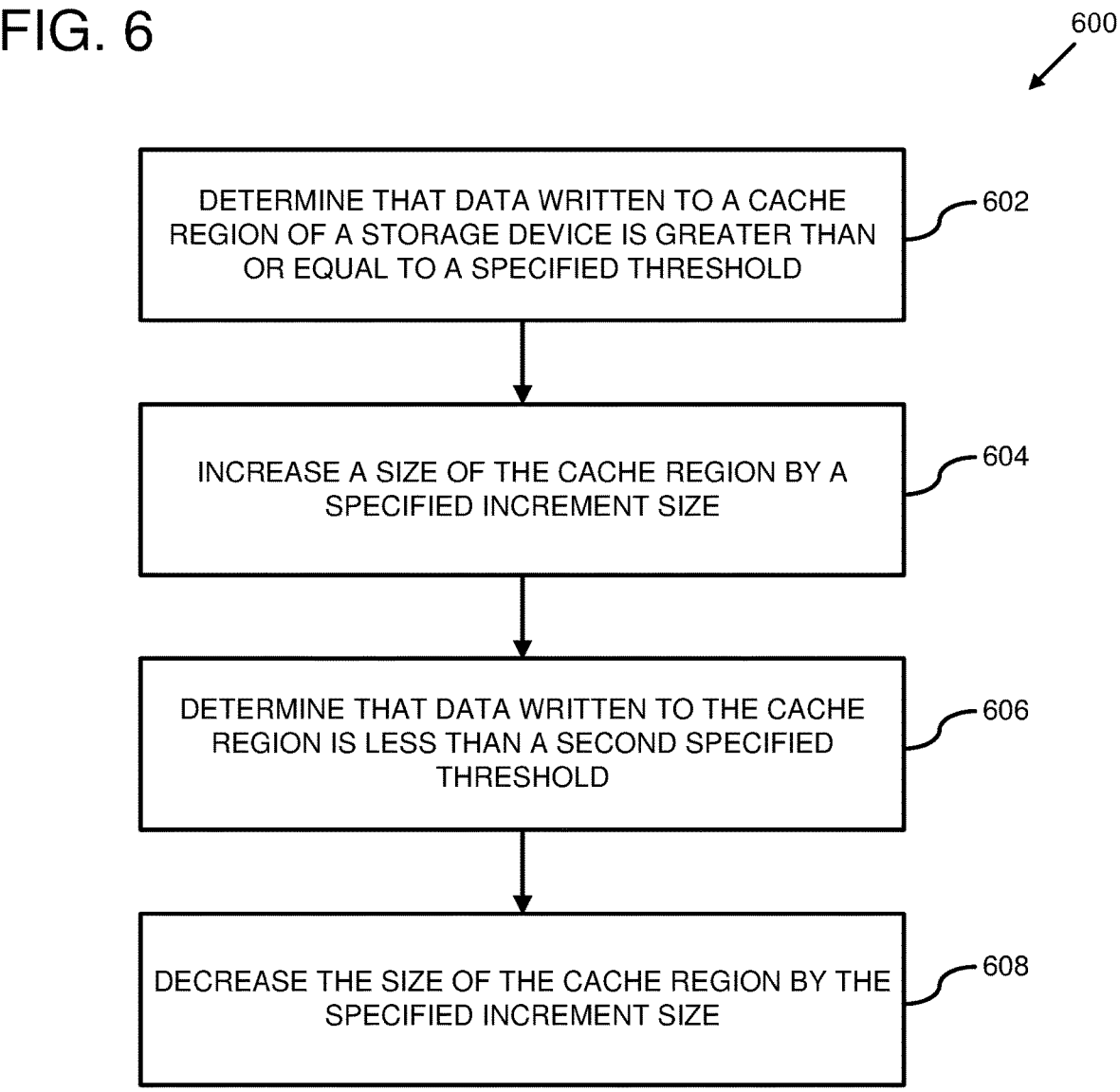
FIG. 6 is a flowchart of an example method of dynamically increasing and decreasing a size of a cache region of a storage device.

FIG. 6 is a flowchart of an example method 600 of dynamically increasing and decreasing a size of a cache region of a storage device. Example method 600 can be performed using any of the example systems described herein.

At 602, it is determined that data written to a cache region of a storage device is greater than or equal to a specified threshold. The determining can comprise comparing a total amount of data written to the cache region to a specified threshold amount. The determining can comprise comparing a percentage of the cache region that contains data to a threshold percentage. The determining can comprise tracking a frequency at which the data is written to the cache region and comparing the tracked frequency to a specified threshold frequency. The tracked amount, percentage, and/or frequency can be determined within a specified period of time. Alternatively, the amount, percentage, and/or frequency can be counted or determined since the cache region was last flushed.

At 604, a size of the cache region is increased by a specified increment size. In some embodiments, the size of the cache region is increased responsive to the determining that data written to the cache region is greater than or equal to the specified threshold. In different or further embodiments, the cache region size is increased if the amount of data written to the cache region meets or exceeds the specified threshold a certain number of times within a specified time period. The increment size can be a fixed amount, a percentage of the cache region's capacity, a percentage of the storage device's total capacity, etc. In some embodiments, the specified increment size is based, at least in part, on an amount by which the data written exceeds the specified threshold.

At 606, it is determined that data written to the cache region is less than a second specified threshold. The determining at 602 can be similar to the determining at 602. The data written to the cache region can be data written subsequent the increase of the size of the cache at 604. The data written to the cache region can be data written subsequent to a flush of the cache region.

At 608, the size of the cache region is decreased by the specified increment size. In some embodiments, the size of the cache region is decreased responsive to the determining that the data written to the cache region is less than the second specified threshold. In different or further embodiments, the cache region size is decreased if the amount of data written to the cache region falls below the specified threshold a certain number of times within a specified time period. In some embodiments, the specified increment size is based, at least in part, on an amount by which the data written falls below the specified threshold.

Figure 7:
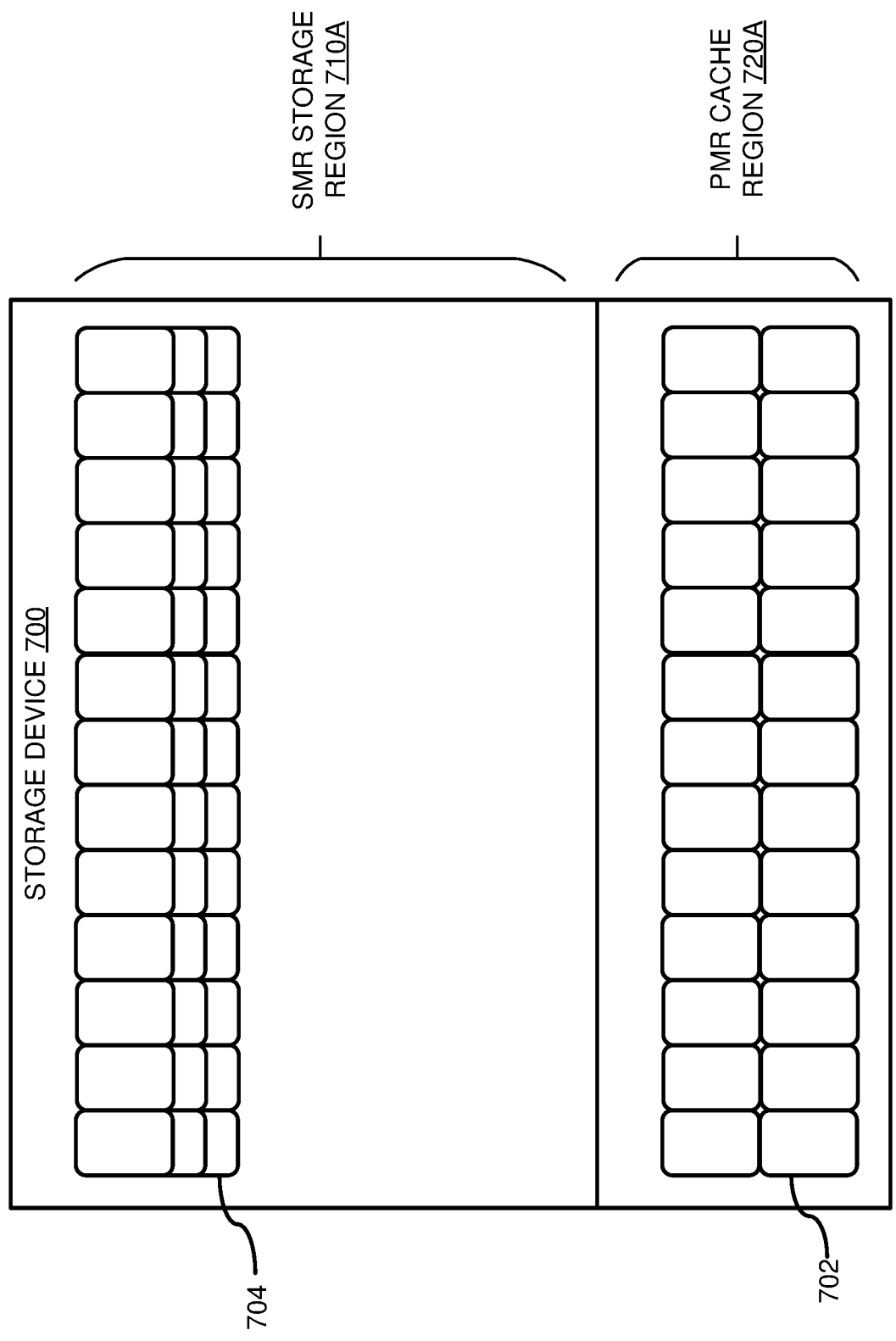
FIG. 7 is a diagram depicting an example storage device 700 comprising a perpendicular magnetic recording (PMR) cache region and a shingled magnetic recording (SMR) storage region with both regions having initial sizes.

FIG. 7 is a diagram depicting an example storage device 700 comprising a cache region 720A and a storage region 710A. Units of data (e.g., 702 and 704) are stored in both the cache region 720A and the storage region 710A. The units of data can be bits, bytes, data blocks, etc. Units of data are stored in the cache region 720A using a PMR storage format. Units of data are stored in the storage region 710A using an SMR storage format.

Units of data can be written to cache region 720A first and subsequently moved to storage region 710A. In some cases, data units can be written the cache region 720A faster than they can be written to storage region 710A. For example, a random access write operation to a data unit 702 in the cache region 720A can be performed without having to modify any of the other data units stored in the cache region 720A. Contrastingly, due to the overlapping nature of data units stored using SMR, the data unit 704 in the storage region 710A cannot be modified via a random access write without also re-writing other data units. In some cases, more data units can be stored in the storage region 710A than can be stored in the cache region 720A, since SMR allows data units to be stored more densely than PMR.

FIG. 7 depicts the cache region 720A and storage region 710A set to initial sizes. At least some embodiments of the technologies described herein can be used to dynamically change the sizes of the cache region 720A and the storage region 710A.

Figure 8:
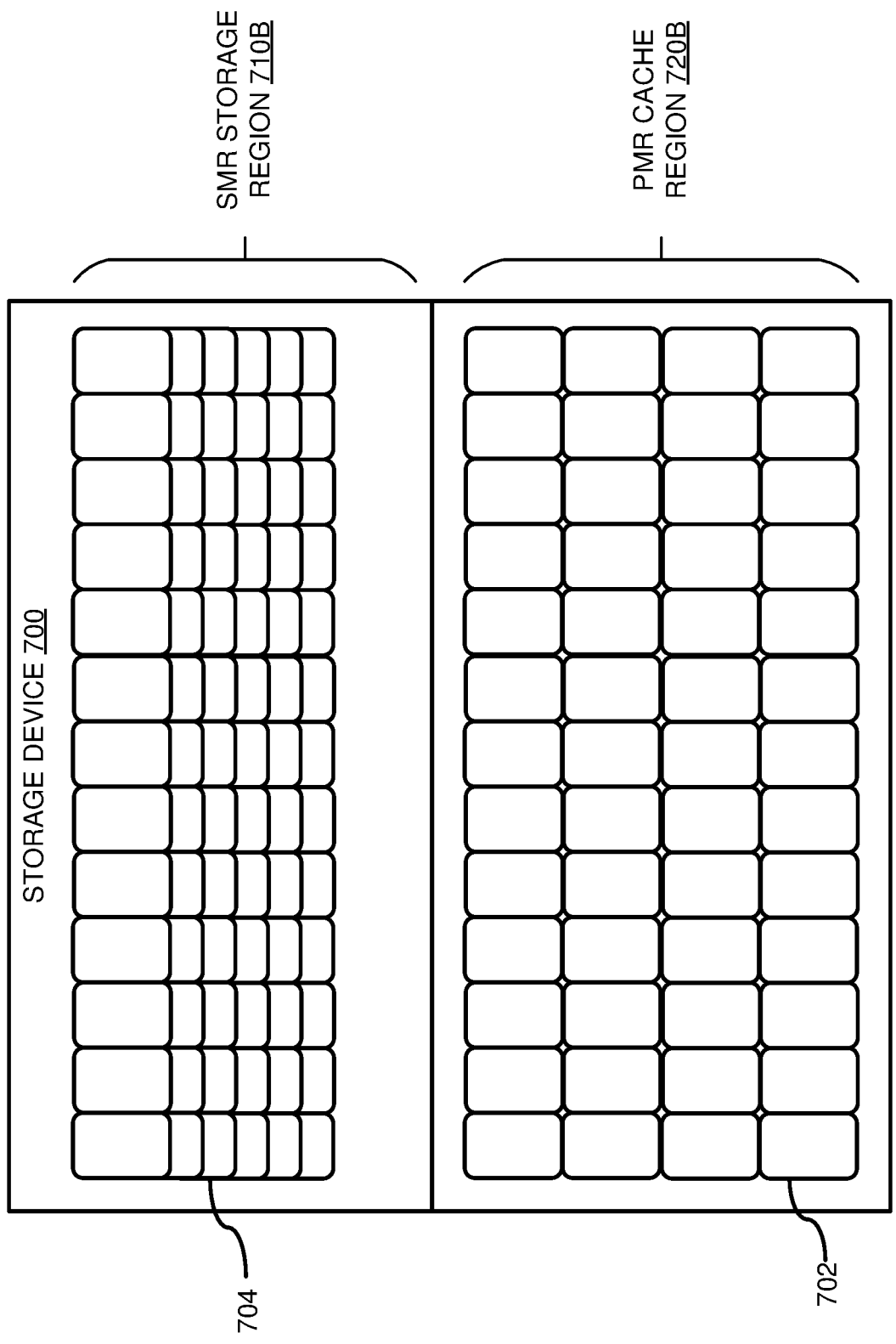
FIG. 8 is another diagram depicting storage device 700 with the PMR cache region increased in size and the SMR storage region decreased in size.

FIG. 8 is a diagram depicting the storage device 700 with a cache region 720B having an increased size and a storage region 710B having a decreased size. The size of the cache region 720B is increased in response to changes in data access activity. For example, an amount of data units written to the cache region 720B can be greater than or equal to a specified threshold and trigger a dynamic increase to the size of cache region 720B.

In a particular example, storage device 700 can "heat up" by receiving a large number of write accesses in a short period of time. In response to this, the size of the cache region 720B can be increased to allow units of data to be written to the storage device 700 quickly by storing them in the cache region 720B.

Figure 9:
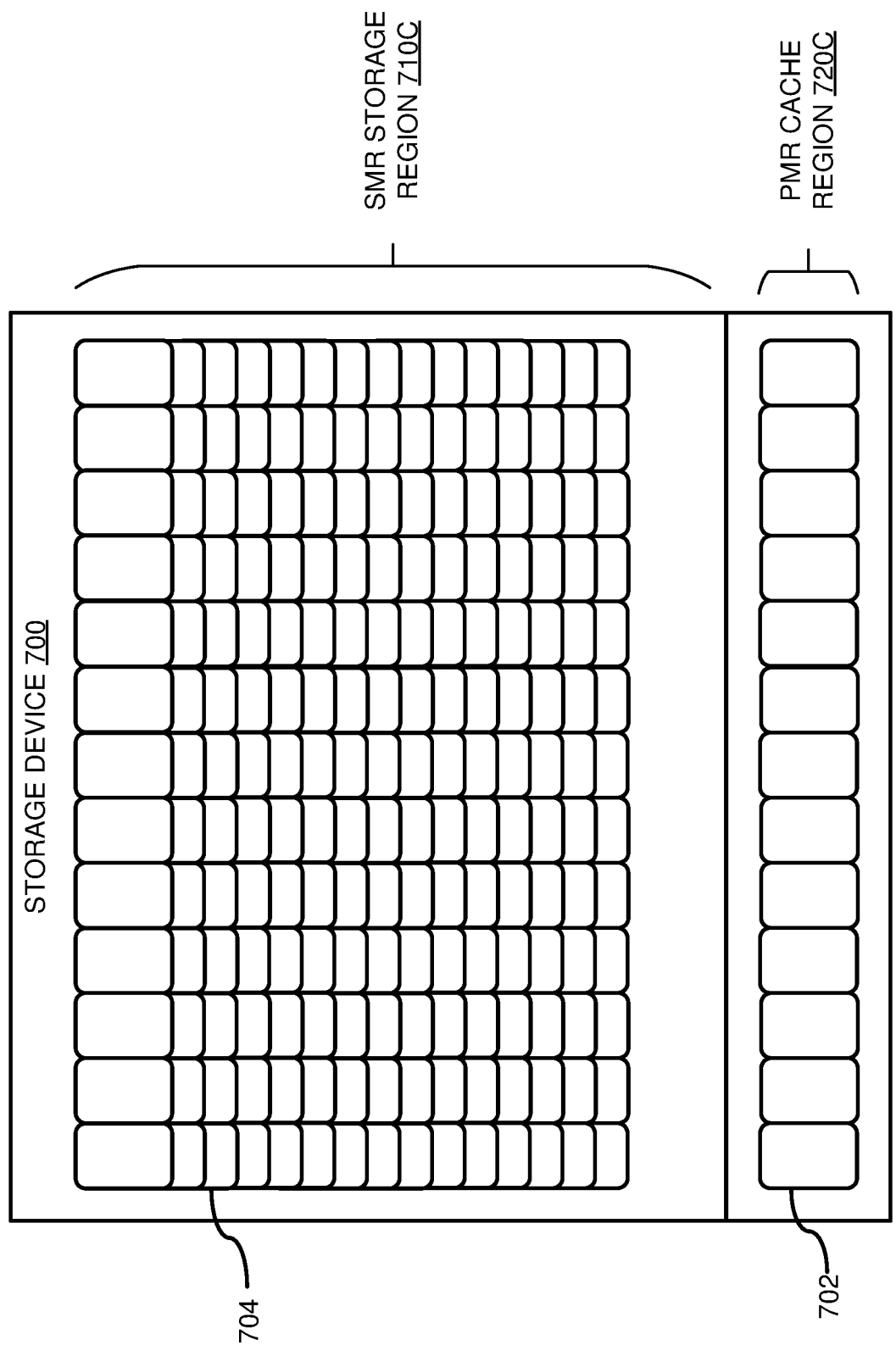
FIG. 9 is a third diagram depicting storage device 700 with the SMR storage region increased in size and the PMR cache region decreased in size.

FIG. 9 depicts storage device 700 with a storage region 720C having an increased size and a cache region 720C having a decreased size. The size of the cache region 720C is decreased in response to changes in data access activity. For example, an amount of data units written to the cache region 720C can be less than or equal to a specified threshold and trigger a dynamic decrease to the size of the cache region 720C.

In a particular example, storage device 700 can "cool off" when the number of write accesses received begins to drop off. During the period of decreased write activity, data units can be migrated from the cache region 720C to the storage region 710C. If the amount of data units stored in the cache region 720C remains below a certain level for a sufficient period of time, the size of the cache region 720C can be decreased to make room for more data to be stored in the storage zone 720C.

Figure 10:
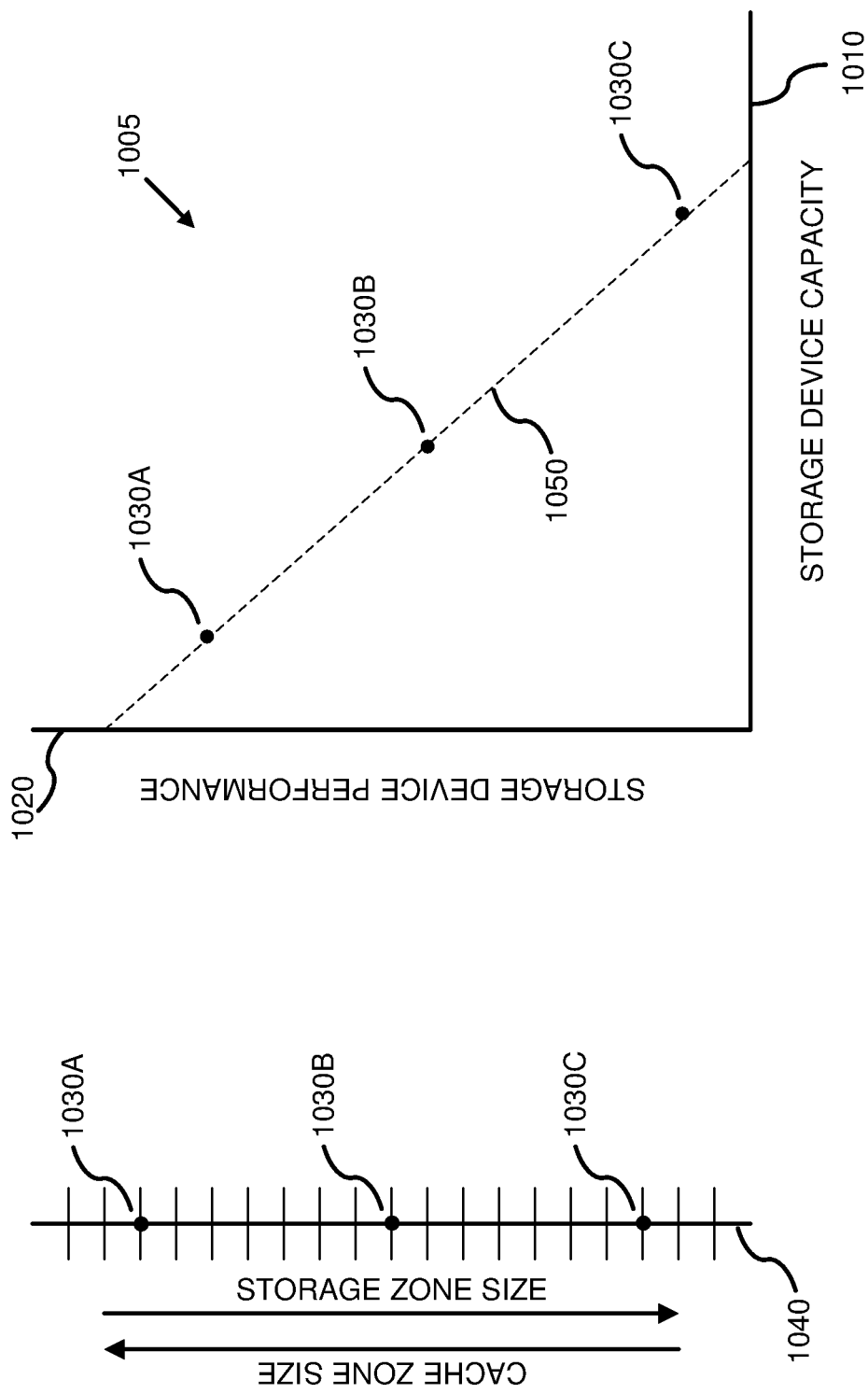
FIG. 10 is a diagram illustrating an example relationship between cache zone size, storage zone size, storage device performance, and storage device capacity.

FIG. 10 is a diagram illustrating an example relationship between cache zone size, storage zone size, storage device performance, and storage device capacity in a storage device comprising a cache zone and a storage zone. In scenarios where the cache zone uses a storage format with better data access performance (such as random write access performance) and the storage zone uses a storage format with better storage capacity, a trade-off can exist between data access performance and data storage capacity that is tied to the relative sizes of the two zones.

1040 is an example scale illustrating an inverse relationship between cache zone size and storage zone size. 1030A on scale 1040 represents an example configuration for the storage device with a large cache zone and a small storage zone. 1030B on scale 1040 represents an example configuration for the storage device with a moderately sized cache zone and a moderately sized storage zone. 1030C on scale 1040 represents an example configuration for the storage device with a small cache zone and a large storage zone.

Example graph 1005 has a y-axis 1020 representing storage device performance and an x-axis 1010 representing total storage device capacity. Example configuration 1030A's large cache zone size provides very good data access performance, but its small storage zone size means that its good data access performance comes at a cost of decreased storage capacity. Example configuration 1030B offers moderate data access performance and moderate storage capacity. Example configuration 1030C has very good storage capacity due to its large storage zone size, but its small cache zone means that it has worse data access performance than example configurations 1030B and 1030C.

Dashed line 1050 represents an example continuum of configurations for the storage device that are possible by dynamically adjusting the sizes of the cache and storage zones. By dynamically adjusting the sizes of the cache and storage zones, the performance and capacity characteristics of the storage device can be dynamically changed in response to changing data access requirements. For example, by changing the size of the cache zone over time, the storage device can be transformed from a relatively low capacity storage device with relatively high data access performance into a higher capacity storage medium with lower data access performance.

Figure 11:
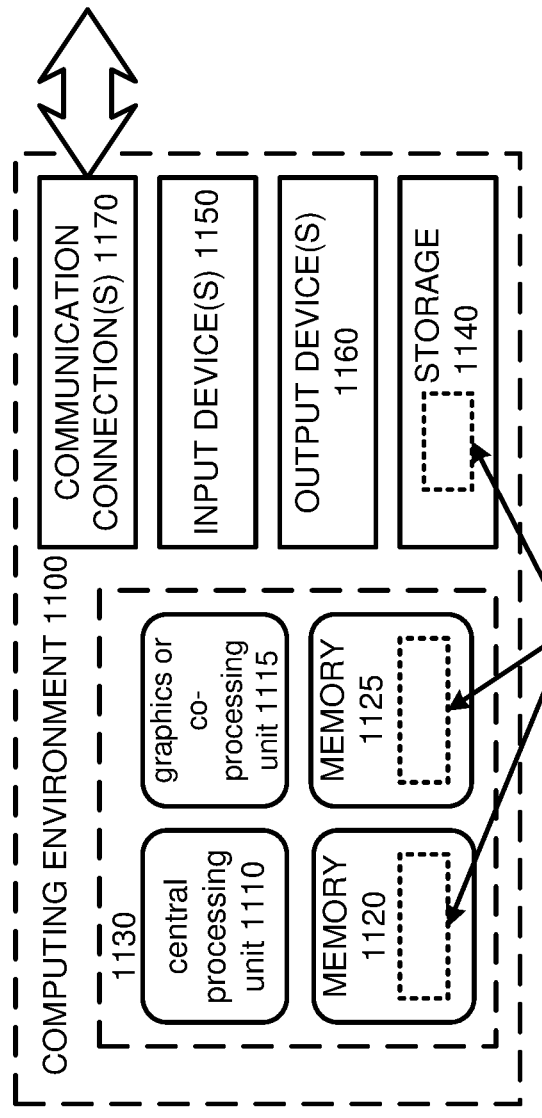
FIG. 11 depicts a generalized example of a suitable computing environment in which the described innovations may be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.).

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

Computing device 1100 can also comprise one or more of the example storage devices described herein.

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein. In some embodiments, storage 1140 comprises one or more of the example storage devices as described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers. A computer-readable storage medium can be a storage device, as described herein.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.*The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A storage device controller, wherein the storage device controller performs operations, the operations comprising:
    receiving first data and buffering the first data in a first region of a storage device in a first storage format, wherein a size of the first region is increased to buffer the first data in the first region, wherein the first region is a cache region having a first data access performance value and a first storage density value, wherein the received first data is a random access write to the storage device;
    moving the buffered first data from the first region to a second region of the storage device in a second storage format, wherein the second storage format is different from the first storage format, wherein the second region is a non-cache storage region having a second data access performance value and a second storage density value, wherein the first data access performance is higher than the second data access performance value for random access writes but wherein the first data access performance and the second data access performance are substantially equivalent for sequential write accesses and wherein the first storage density value is lower than the second storage density value;
    decreasing the size of the first region after the buffered first data is moved from the first region;
    receiving second data in the storage device, wherein the second data is a sequential write access; and
    moving the second data directly to the second region instead of the first region because the sequential write access performance is substantially equivalent for the first and second regions.

2. The storage device controller of claim 1, wherein the increasing the size of the first region comprises determining that data is written to the first region at a rate that is faster than a specified threshold.

3. The storage device controller of claim 2, wherein the specified threshold is a frequency of write operations.

4. The storage device controller of claim 1, wherein the increasing the size of the first region comprises determining that the first region is more frequently accessed than the second region.

5. The storage device controller of claim 1, wherein the increasing the size of the first region comprises determining that the first region is more recently accessed than the second region.

6. The storage device controller of claim 1, wherein the increasing the size of the first region comprises determining that the first region is more critical than the second region.

7. The storage device controller of claim 1, wherein the increasing the size of the first region comprises determining that more than a certain percentage of the first region contains data and data is being written to the first region faster than a specified rate.

8. The storage device controller of claim 1, wherein the increasing the size of the first region comprises determining that more than a specified amount of data is written to the first region within a specified time period.

9. The storage device controller of claim 1, wherein the increasing and decreasing comprise:
monitoring data writes to the first region of the storage device;
determining the rate at which the data is written to the first region based on the monitored data writes; and
comparing the determined rate to the specified threshold rate.

10. The storage device controller of claim 1, wherein the storage device controller is implemented, at least in part, in a hardware component of the storage device.

11. A system, comprising:
a computer-readable storage medium comprising:
a first storage region wherein data is stored in a first storage format having a first storage density and a first data access speed, wherein the first storage region is a cache region, and
a second storage region wherein data is stored in a second storage format, wherein the second storage format is different from the first storage format, and wherein the second storage format has a second storage density and second data access speed, and wherein the first data access speed is faster than the second data access speed for random access writes but the first data access speed is roughly equivalent to the second data access speed for sequential write accesses, but the first storage density is lower than the second storage density, wherein the second storage region is a non-cache region; and
a storage device controller configured to:
for random access writes:
receive data and buffer the data in the first storage region, wherein a size of the first storage region is increased to buffer the data in the first storage region,
move the buffered data from the first storage region to the second storage region, and
decrease the size of the first storage region after the buffered data is moved from the first storage region;
for sequential write accesses:
receive data and move the data directly to the second storage region without storing the data in the first storage region.

12. The system of claim 11, wherein the computer-readable storage medium comprises a magnetic disk.

13. The system of claim 12, wherein the first storage region of the computer-readable storage medium comprises an outermost circular track of the magnetic disk.

14. The system of claim 11, wherein:
the first storage format is a perpendicular magnetic recording format; and
the second storage format is a shingled magnetic recording format.

15. The system of claim 11, wherein the increasing the size of the first storage region comprises determining that data is written to the first storage region at a rate that is faster than a specified threshold.

16. The system of claim 15, wherein the specified threshold is a frequency of write operations.

17. The system of claim 11, wherein the increasing the size of the first storage region comprises determining that the first storage region is more frequently accessed than the second storage region.

18. The system of claim 11, wherein the increasing the size of the first storage region comprises determining that the first storage region is more recently accessed than the second storage region.

19. The system of claim 11, wherein the increasing the size of the first storage region comprises determining that the first storage region is more critical than the second storage region.

20. A method of dynamically adjusting a size of a buffer region of a storage device, the method comprising:
receiving first data and buffering the first data in the buffer region of the storage device in a first storage format, wherein the size of the buffer region is increased to buffer the first data in the buffer region, wherein the buffer region is a cache region, wherein the received first data is a random access write to the storage device;
moving the buffered first data from the buffer region to a second region of the storage device in a second storage format, wherein the second storage format is different from the first storage format and is not a cache region, wherein the first storage format has a first data access speed for random access writes and a first data storage density and the second storage format has a second data access speed for random access writes and a second data storage density, wherein the first data access speed is faster than the second data access speed and the first data storage density is less than the second data storage density;
decreasing the size of the buffer region after the buffered data is moved from the buffer region;
receiving second data, which is a sequential write access of the storage device, wherein a data access speed for the first and second regions are nearly equivalent for sequential write accesses; and
moving the second data to the second region without storing the second data in the first region.

* * * * *